US011167497B2

(12) United States Patent
Brown et al.

(10) Patent No.: US 11,167,497 B2
(45) Date of Patent: Nov. 9, 2021

(54) LOCALISING SENSOR DATA COLLECTED DURING ADDITIVE MANUFACTURING

(71) Applicant: RENISHAW PLC, Wotton-under-Edge (GB)

(72) Inventors: Ceri Brown, Plaisance-du-Touch (FR); John Dardis, Stroud (GB); Allan Christopher Norman, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 278 days.

(21) Appl. No.: 16/341,246

(22) PCT Filed: Nov. 10, 2017

(86) PCT No.: PCT/GB2017/053384
§ 371 (c)(1),
(2) Date: Apr. 11, 2019

(87) PCT Pub. No.: WO2018/087556
PCT Pub. Date: May 17, 2018

(65) Prior Publication Data
US 2019/0283332 A1    Sep. 19, 2019

(30) Foreign Application Priority Data

Nov. 14, 2016  (WO) ............... PCT/GB2016/053559
May 16, 2017  (GB) .................................... 1707807

(51) Int. Cl.
*B29C 64/393*  (2017.01)
*B33Y 30/00*  (2015.01)
(Continued)

(52) U.S. Cl.
CPC ............ *B29C 64/393* (2017.08); *B22F 10/20* (2021.01); *B29C 64/20* (2017.08); *B33Y 30/00* (2014.12);
(Continued)

(58) Field of Classification Search
CPC ..... B29C 64/393; B29C 64/20; B29C 64/153; B33Y 10/00; B33Y 30/00; B33Y 50/002; G01B 11/002; G02B 26/101
See application file for complete search history.

(56) References Cited

U.S. PATENT DOCUMENTS

| 5,182,715 A | 1/1993 | Vorgitch et al. |
| 5,844,673 A | 12/1998 | Ivers |

(Continued)

FOREIGN PATENT DOCUMENTS

| CN | 1135732 A | 11/1996 |
| CN | 101821081 A | 9/2010 |

(Continued)

OTHER PUBLICATIONS

Sep. 17, 2020 Restriction Election Issued in U.S. Appl. No. 15/775,133.

(Continued)

*Primary Examiner* — Yung-Sheng M Tsui
*Assistant Examiner* — Melody Tsui
(74) *Attorney, Agent, or Firm* — Oliff PLC

(57) ABSTRACT

A method of monitoring an additive manufacturing process, in which an object is built in a layer-by-layer manner by directing a laser beam using at least one movable guiding element of a scanner to solidify selected regions of a material bed. The method includes recording position values generated from a transducer measuring positions of the at least one movable guiding element, recording sensor values generated from a sensor for detecting radiation emitted from the material bed and transmitted to the sensor by the movable guiding element of the scanner, and associating each sensor value with a corresponding one of the position values.

13 Claims, 6 Drawing Sheets

(51) Int. Cl.
  *B33Y 50/02*   (2015.01)
  *B29C 64/20*   (2017.01)
  *G01B 11/00*   (2006.01)
  *E05C 1/16*    (2006.01)
  *B22F 10/20*   (2021.01)
  *B33Y 10/00*   (2015.01)
  *B29C 64/153*  (2017.01)
  *G02B 26/10*   (2006.01)
  *B22F 10/30*   (2021.01)

(52) U.S. Cl.
  CPC ............ *B33Y 50/02* (2014.12); *E05C 1/16* (2013.01); *G01B 11/002* (2013.01); *B22F 10/30* (2021.01); *B29C 64/153* (2017.08); *B33Y 10/00* (2014.12); *G02B 26/101* (2013.01); *Y02P 10/25* (2015.11)

(56) References Cited

U.S. PATENT DOCUMENTS

| | | | |
|---|---|---|---|
| 5,926,188 A | 7/1999 | Kawamoto et al. | |
| 6,126,884 A | 10/2000 | Kerekes et al. | |
| 6,325,961 B1 | 12/2001 | Beers et al. | |
| 8,040,530 B2 | 10/2011 | Cooper | |
| 8,681,352 B2 | 3/2014 | Shenoy et al. | |
| 2013/0168902 A1* | 7/2013 | Herzog | B29C 64/393 264/401 |
| 2013/0199748 A1 | 8/2013 | Christensen et al. | |
| 2013/0316081 A1 | 11/2013 | Kovalcik et al. | |
| 2015/0135897 A1 | 5/2015 | Sutcliffe et al. | |
| 2015/0375456 A1 | 12/2015 | Cheverton et al. | |
| 2016/0082668 A1 | 3/2016 | Perret et al. | |
| 2016/0184893 A1 | 6/2016 | Dave et al. | |
| 2018/0056390 A1* | 3/2018 | O'Neill | B29C 64/393 |
| 2018/0169948 A1 | 6/2018 | Coeck et al. | |
| 2018/0370144 A1* | 12/2018 | Revanur | B29C 64/268 |

FOREIGN PATENT DOCUMENTS

| | | |
|---|---|---|
| CN | 104507601 A | 4/2015 |
| DE | 10 2012 221 218 A1 | 5/2013 |
| DE | 10 2015 000 103 A1 | 7/2016 |
| DE | 10 2015 113 700 A1 | 10/2016 |
| EP | 1 026 564 A2 | 8/2000 |
| EP | 1 847 377 A2 | 10/2007 |
| EP | 2 829 386 A1 | 1/2015 |
| GB | 2 491 472 A | 12/2012 |
| JP | H09-185721 A | 7/1997 |
| JP | H11-198235 A | 7/1999 |
| JP | 2003-245981 A | 9/2003 |
| JP | 2005-527025 A | 9/2005 |
| JP | 2008-155538 A | 7/2008 |
| JP | 2009-6509 A | 1/2009 |
| JP | 2013-067018 A | 4/2013 |
| WO | 95/11100 A1 | 4/1995 |
| WO | 2007/147221 A1 | 12/2007 |
| WO | 2010/007396 A1 | 1/2010 |
| WO | 2013/156119 A1 | 10/2013 |
| WO | 2014/199134 A1 | 12/2014 |
| WO | 2014/207454 A1 | 12/2014 |
| WO | 2015/040433 A2 | 3/2015 |
| WO | 2015/140547 A1 | 9/2015 |
| WO | 2015/195909 A1 | 12/2015 |
| WO | 2016/156824 A1 | 10/2016 |
| WO | 2016/198885 A1 | 12/2016 |
| WO | 2016/201390 A1 | 12/2016 |

OTHER PUBLICATIONS

Jan. 4, 2021 Office Action Issued in U.S. Appl. No. 15/775,133.
Feb. 24, 2016 Search Report issued in British Patent Application No. 1600122.4.
Feb. 24, 2017 International Search Report issued in International Patent Application No. PCT/GB2016/053559.
Feb. 24, 2017 Written Opinion of the International Searching Authority issued in International Patent Application No. PCT/GB2016/053559.
U.S. Appl. No. 15/775,133, filed May 10, 2018 in the name of Revanur et al.
Mar. 26, 2018 International Search Report issued in International Patent Application No. PCT/GB2017/053384.
Mar. 26, 2018 Written Opinion of the International Searching Authority issued in International Patent Application No. PCT/GB2017/053384.
Jul. 4, 2017 Search Report issued in British Patent Application No. 1707807.2.

* cited by examiner

LOCALISING SENSOR DATA COLLECTED DURING ADDITIVE MANUFACTURING

FIELD OF INVENTION

This invention concerns apparatus and method for localising sensor data collected through an optical train of an optical scanner of an additive manufacturing apparatus, such as a powder bed fusion apparatus, to a location in the additive manufacturing apparatus and/or in an object manufactured using the additive manufacturing apparatus.

BACKGROUND

Additive manufacturing or rapid prototyping methods for producing parts comprise layer-by-layer solidification of a flowable material. There are various additive manufacturing methods, including material bed systems, such as selective laser melting (SLM), selective laser sintering (SLS) and stereolithography systems.

In selective laser melting, a powder layer is deposited on a powder bed in a build chamber and a laser beam is scanned across portions of the powder layer that correspond to a cross-section (slice) of the object being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one object can be built, the parts spaced apart in the powder bed.

The laser beam is typically scanned over the powder bed using an optical scanner comprising a pair of tilting mirrors, each rotated under the control of a galvanometer. Transducers are arranged to measure a position of the mirrors/galvanometers for control of the mirror positons. In this way, a demand position can be achieved.

WO 2007/147221 A1 discloses a selective laser melting apparatus comprising a scanner for scanning the laser beam across the powder surface and a spatially resolved detector (e.g. a CCD or CMOS camera) or an integrated detector (e.g. a photodiode with a large active area) for capturing radiation emitted by a melt zone and transmitted through an optical system of the scanner.

US 2013/0168902 A1 discloses a method for producing a three-dimensional component by means of a laser melting process, wherein sensor values captured using the device disclosed in WO 2007/147221 A1 are stored together with coordinate values that locate the sensor values in the component and are displayed by means of a visualisation unit in a two- and/or multi-dimensional representation with respect to the detection location of the sensor value in the component.

The sensor values may be localised to coordinate values using build coordinate values (so called "demand data"—information underlying the building process). However, this can lead to inaccuracies in the localisation of the sensor data as there can be differences between the demand position of the tilting mirrors of the scanner at the time of capture of a sensor value and an actual position of the titling mirrors due to delays in transmission of the demand signal, inertia of the titling mirrors, noise in the system interfering with the demand signals etc.

Alternatively, the sensor values may be localised to coordinate values using areal capture of the powder bed. However, a camera of sufficient resolution and frame rate to achieve the required positional accuracy of a melt zone is extremely expensive or, for large beds, not achievable with current technology.

SUMMARY OF INVENTION

According to a first aspect of the invention there is provided a method of monitoring an additive manufacturing process, in which an object is built in a layer-by-layer manner by directing a laser beam using at least one movable guiding element of a scanner to solidify selected regions of a material bed, the method comprising recording position values generated from a transducer measuring positions of the at least one movable guiding element, recording sensor values generated from a sensor for detecting radiation emitted from the material bed and transmitted to the sensor by the movable guiding element of the scanner, and associating each sensor value with a corresponding one of the position values.

In this way, the sensor values can be localised in the object and/or in the material bed based upon the measured positions of the movable guiding element. This may avoid inaccuracies in a localisation of the sensor, which may arise when using the demand position or an areal capture of the material bed to localise the sensor values. Furthermore, transducers for measuring a positon of the movable guiding element of the scanner are typically provided for controlling positioning of the movable guiding element, obviating the need for additional devices, such as high resolution, fast frame rate cameras, for determining a capture location for the sensor value. Measuring temperature of the material bed, a melt pool, melt pool size, shape or other dimensions, melt pool temperature, etc may not be sufficient for validating an additive manufacturing process. For validating an additively built object, in addition, it can be important to accurately know whether a melted region/solidified region has been formed in a desired location. The invention enables such positions to be determined from the position values generated from the transducer measuring positions of the at least one movable guiding element.

The at least one movable guiding element may comprise a first movable guiding element for directing the laser beam in a first dimension and a second movable guiding element for directing the laser beam in a second dimension substantially perpendicular to the first dimension, the method comprising recording first position values generated from a first transducer measuring positions of the first movable guiding element and recording second position values generated from a second transducer measuring positions of the second movable guiding element and associating each sensor value with a corresponding one of the first and second position values.

The additive manufacturing process may comprise directing a laser beam using a further movable guiding element for directing the laser beam in a same dimension as the at least one movable guiding element, the method comprising recording further position values generated from a further transducer measuring positions of the further movable guiding element and associating each sensor value with a corresponding one of the further position values. For example, the further movable guiding element may be for directing the laser beam in the first or second dimension. The further movable guiding element may provide a faster dynamic response but a smaller range of movement of the laser beam than the at least one movable guiding element. For example, the scanner may be a scanner as described in WO2016/156824, which is incorporated herein by reference.

The at least one movable guiding element may be one or more tiltable mirrors. The or each tiltable mirror may be moved under the control of an actuator, such as a galvanometer. The transducer may measure an angular position of the or each tiltable mirror.

Alternatively or additionally, the movable guiding element may be an optical element, such as at least one mirror, mounted to be movable on a gantry system to enable the optical element to direct the laser beam to different regions of the material bed. The transducer may measure a position of the optical element on the gantry.

The further guiding element may be one or more further tiltable mirrors. Each further tiltable mirror may be movable under the control of an actuator, such as a piezoelectric actuator. The further transducer may measure an angular position of the further tiltable mirror Associating each sensor value with a corresponding one of the position values may comprise associating the sensor value and corresponding one of the position values with a common identifier. The common identifier may be a time, such as a time associated with a demand signal instructing the scanner to move the laser beam to a position on the material bed and/or a time derived from a clock signal.

Associating each sensor value with a corresponding one of the position values may comprise packaging the sensor value and the corresponding one of the position in a single data packet.

The method may comprise localising the sensor values in the object and/or in the additive manufacturing apparatus based upon the measured positions of the movable guiding element. Localising the sensor values in the object may comprise localising the sensor values in a coordinate reference frame of the object. Localising the sensor values in the additive manufacturing apparatus may comprise localising the sensor values in a coordinate reference frame of the material bed. (The material bed is typically moved with movement of a build platform in the additive manufacturing apparatus. Accordingly, a coordinate reference frame of the material bed may not be fixed relative to other elements of the apparatus, such as the scanner). Localising the sensor values in the additive manufacturing apparatus may comprise localising the sensor values in a coordinate reference frame of the scanner, such as a polar coordinate reference frame of the tiltable mirrors or Cartesian coordinate reference frame of the gantry. In the case of a scanner comprising a combination of tiltable mirrors movable in a gantry system, the method may comprise localising the sensor values in a coordinate reference frame fixed relative to an axis/axes of rotation of the tiltable mirror(s).

The method may comprise displaying the sensor values in a multi-dimensional representation with respect to a localised position of the sensor value in the object and/or in the material bed. The multi-dimensional representation may comprise a two-dimensional, three-dimensional and/or four-dimensional representation of the sensor data in the object and/or in the material bed.

The method may comprise shielding signals from the transducer from external noise and/or demand signals for the scanner. The transducer may generate analogue signals and the method may comprise shielding the analogue signals from external noise and/or the demand signals until the analogue signals are converted into digital signals.

The transducer may generate analogue signals and the method may comprise filtering the analogue signals for noise before the analogue signals are converted into digital signals.

According to a second aspect of the invention there is provided a scanner for an additive manufacturing apparatus, in which an object is built in a layer-by-layer manner, the scanner comprising at least one guiding element for directing a laser beam to solidify selected regions of a material bed, a transducer for measuring positions of the at least one movable guiding element, an optical path having an output for light to be directed towards a sensor for detecting radiation emitted from the material bed and transmitted to the output by the movable guiding element, and an interface for outputting position signals generated by the transducer from the scanner.

In this way, the actual position of the movable guiding element can be read out from the scanner and used, for example, for localising the sensor values in the object and/or in the material bed.

The at least one movable guiding element may comprise a first movable guiding element for directing the laser beam in a first dimension and a second movable guiding element for directing the laser beam in a second dimension substantially perpendicular to the first dimension and the interface is for outputting first position signals generated from the first transducer and second position signals generated from a second transducer.

The scanner may comprise directing a laser beam using a further movable guiding element for directing the laser beam in a same dimension as the at least one movable guiding element and the interface is for outputting further position signals generated by the further transducer. The further movable guiding element may be for directing the laser beam in the first or second dimension. The further movable guiding element may provide a faster dynamic response but a smaller range of movement of the laser beam than the at least one movable guiding element. For example, the scanner may be a scanner as described in WO2016/156824, which is incorporated herein by reference.

The at least one movable guiding element may be one or more tiltable mirrors. The or each tiltable mirror may be moved under the control of an actuator, such as a galvanometer. The transducer may measure an angular position of the or each tiltable mirror. The transducer may be in accordance with the position detector described in U.S. Pat. No. 5,844,673. Alternatively, the transducer may measure positons of the tiltable mirror directly rather than via shaft positions. For example, the transducer may comprise a laser that directs a laser beam onto a front or a back of the mirror and a detector for measuring the reflected laser beam. An intensity of the laser beam on the mirror may change with mirror position. Measuring the mirror positon in this manner may eliminate hidden modes associated with shaft torsion.

Alternatively or additionally, the movable guiding element may be an optical element, such as at least one mirror, mounted to be movable on a gantry system to enable the optical element to direct the laser beam to different regions of the material bed. The transducer may measure a position of the optical element on the gantry.

The further guiding element may be one or more further tiltable mirrors. Each further tiltable mirror may be movable under the control of an actuator, such as a piezoelectric actuator. The further transducer may measure an angular position of the further tiltable mirror. The transducers may be as described above with respect to the one or more tiltable mirrors.

An optical path including the at least one movable guiding element may be housed within a light tight housing.

The interface may provide shielding of the output for the position signals from external sources of electromagnetic interference and/or electromagnetic interference generated by demand signals.

The interface may further provide an input for the demand signals for controlling a position of the movable guiding element. The interface may comprise output lines for the positon signals and input lines for the demand signals and shielding for shielding each of the input and output lines from electromagnetic interference generated by the other of the input and output circuitry. The input and output lines may be provided as different layers of a printed circuit board, wherein the input and output lines are separated by a ground plane to shield each of the input and output lines from electromagnetic interference generated by the signals on the other of the input and output line.

The scanner may further comprise processing circuitry for processing the position signals. The transducer may generate analogue position signals and the processing circuitry comprises an analogue to digital converter for converting the analogue position signals into digital position signals. Digital positon signals are more resilient to interference than the analogue signals. The processing circuitry may further comprise a filter for filtering noise from the position signals. The processing circuitry may be housed within a housing shielding the processing circuitry from external electromagnetic interference.

Due to the required accuracy in the position values for localising the sensor values and the significant electromagnetic noise generated by an additive manufacturing apparatus, shielding of the position signals from interference can be important in outputting the position signals with the required accuracy.

According to a third aspect of the invention there is provided an additive manufacturing apparatus in which an object is built in a layer-by-layer manner comprising a scanner according to the second aspect of the invention.

The additive manufacturing apparatus may be arranged to carry out the method of the first aspect of the invention.

According to a fourth aspect of the invention there is provided a method of identifying a location in an object or in an additive manufacturing apparatus of a region captured by a sensor during an additive manufacturing process, in which an object is built in a layer-by-layer manner by directing a laser beam using at least one movable guiding element of a scanner to solidify selected regions of the material bed, the sensor arranged for detecting radiation emitted from the material bed and transmitted to the sensor by the movable guiding element, the method comprising receiving sensor values generated from the sensor, receiving position values generated by a transducer measuring positions of the at least one movable guiding element, each sensor value associated with a corresponding one of the position values, and, for each sensor value, determining a localised position in the object and/or in the additive manufacturing apparatus of a region from which the sensor value was generated during the additive manufacturing process.

The method may comprise displaying the sensor values a multi-dimensional representation with respect to a localised position of the sensor value in the object and/or in the material bed. The multi-dimensional representation may comprise a two-dimensional, three-dimensional and/or four-dimensional representation of the sensor data in the object and/or in the material bed.

According to a fifth aspect of the invention there is provided an apparatus comprising a processor, the processor arranged to carry out the method of the fourth aspect of the invention.

The apparatus may comprise a display for displaying the sensor values the multi-dimensional representation.

According to a sixth aspect of the invention there is provided a data carrier having instructions stored thereon, the instructions, when executed by a processor, causing the processor to carry out the method of the fourth aspect of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray(™) disc, a memory (such as a Memory Stick(™), an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF EMBODIMENTS

Figure 1:
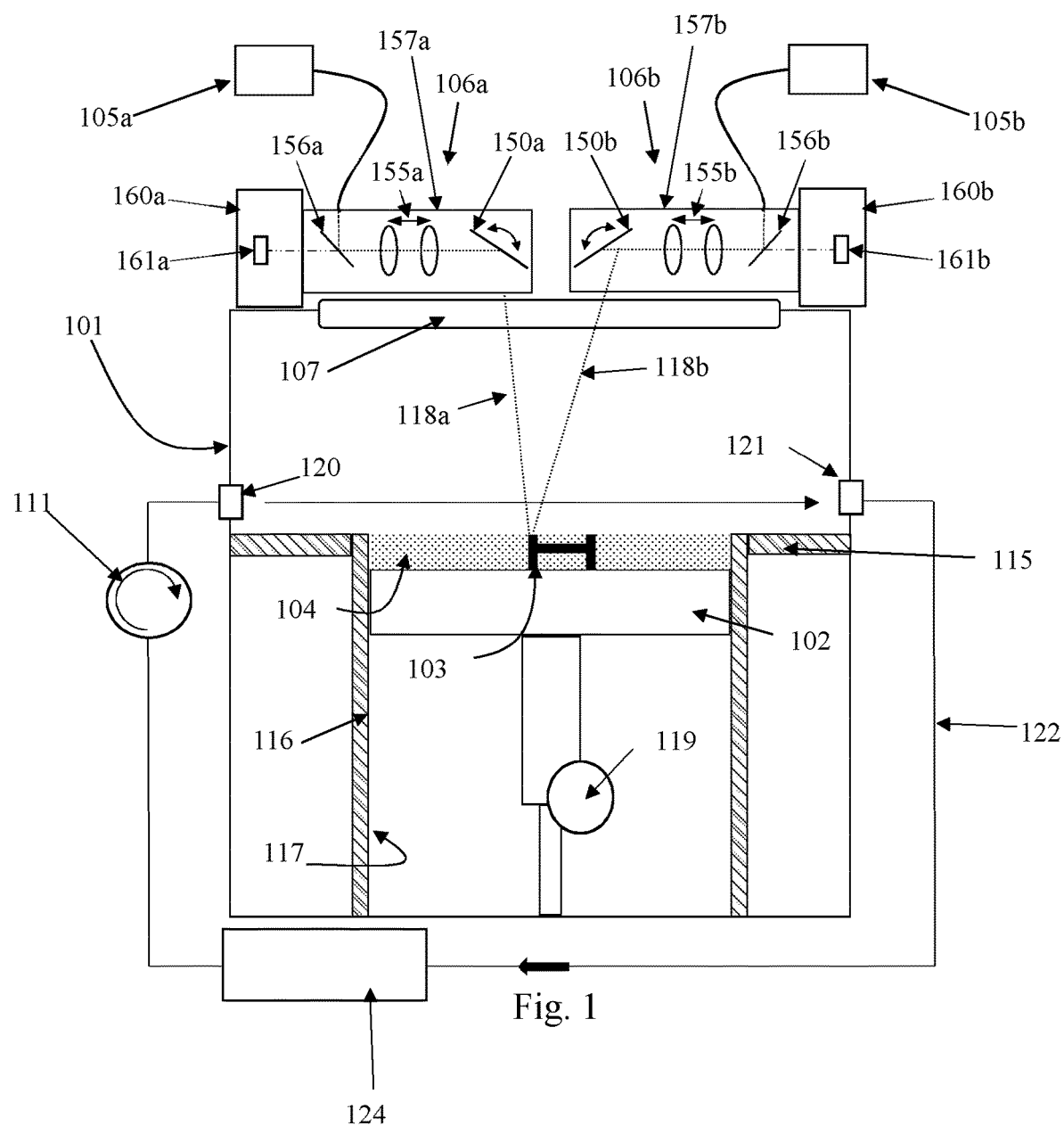
FIG. 1 is a schematic illustration of an additive manufacturing apparatus according to one embodiment of the invention.
Figure 2:
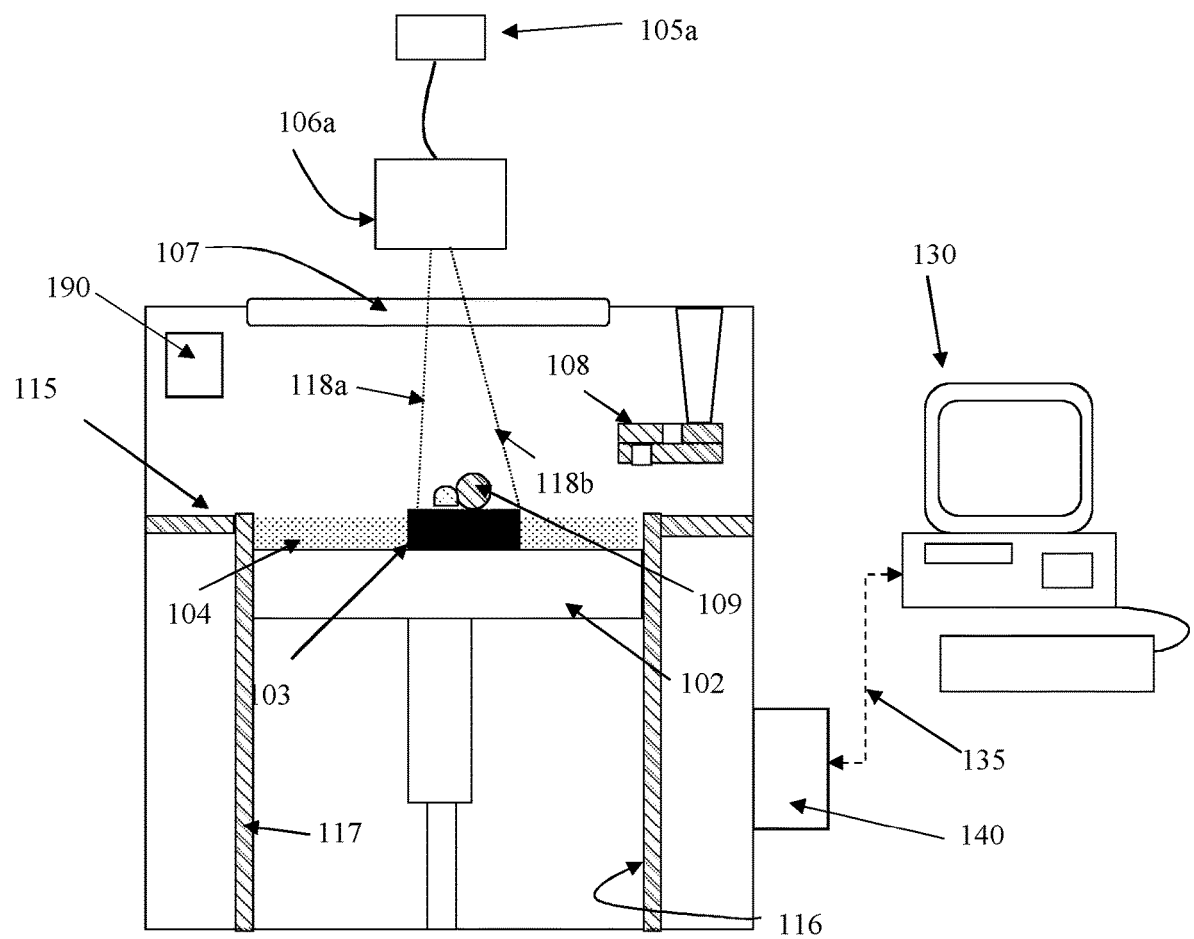
FIG. 2 is a schematic illustration of the additive manufacturing apparatus shown in FIG. 1 from another side.
Figure 3A:
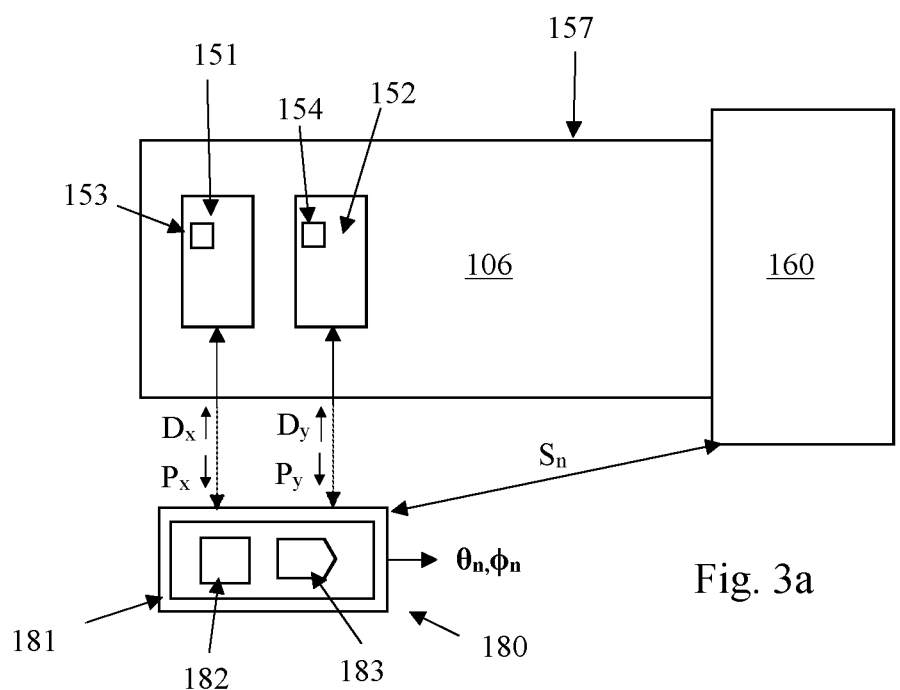
FIG. 3 is a schematic illustration of electronic components of a scanner according to an embodiment of the invention.

Referring to FIGS. 1 to 3, an additive manufacturing apparatus according to an embodiment of the invention comprises a build chamber 101 having therein partitions 115, 117 that define a build sleeve/cylinder 116 and a surface onto which powder can be deposited. A build platform 102 is provided for supporting a workpiece 103 built by selective laser melting powder 104. The platform 102 can be lowered within the build sleeve 116 under the control of motor 119 as successive layers of the workpiece 103 are formed. A build volume available is defined by the extent to which the build platform 102 can be lowered into the build sleeve 116.

Layers of powder are formed as the workpiece 103 is built by lowering the platform 102 and spreading powder dispensed from dispensing apparatus 108 using wiper 109. For example, the dispensing apparatus 109 may be apparatus as described in WO2010/007396. This results in a powder bed 104.

A plurality of laser modules, in this embodiment two laser modules 105a, 105b, generate lasers 118a, 118b for melting the powder 104, the lasers 118a, 118b directed as required by corresponding scanners, in this embodiment optical modules 106a, 106b. The laser beams 118a, 118b enter the chamber 101 via a window 107.

In this embodiment, the laser modules 105a, 105b comprise fibre lasers, such as Nd YAG fibre lasers. The laser beam enters the optical module from above and is reflected towards movable guiding mirrors Each optical module 106a. 106b comprises a pair of movable guiding elements, in the form of tiltable mirrors 150 (only one of which is shown for each optical module 106a, 106b). One of the mirrors 150a, 150b is tiltable to steer the laser beam in an X-direction and the other tiltable mirror 150a, 150b is tiltable to steer the laser beam in a Y-direction perpendicular to the X-direction. Movement of each tiltable mirror 150a, 150b is driven by a galvanometer 151, 152. A position of each galvanometer is measured by a transducer 153, 154. In this embodiment, the transducer is in accordance with the transducer described in U.S. Pat. No. 5,844,673. Each optical module 106a, 106b further comprises movable focusing optics 155a, 155b for adjusting the focal length of the corresponding laser beam.

A beam splitter 156a, 156b directs light of the laser wavelength from an input to the tiltable mirrors 150a, 150b and transmits light of other wavelengths that is emitted from the powder bed 104 to an in-process monitoring module 160a, 160b. In process monitoring module 160a, 160b comprises at least one detector 161a, 161b for detecting an integrated intensity and/or spatial intensity of the transmitted light.

The optical elements of the scanners are housed in a light-tight housing 157a, 157b.

Figure 3B:
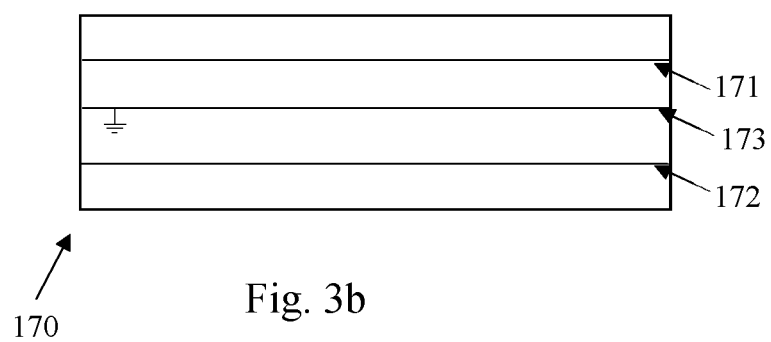

Referring to FIGS. 3 and 3b, high voltage demand signals $D_x$, $D_y$ for driving each galvanometer 151, 152 are sent to the galvanometers 151, 152 from an optical module controller 180. Low voltage analogue position signals $P_x$, $P_y$ from the transducers 153, 154 and sensor signals $S_n$ from the detector 161 are sent to the optical module controller 180.

The optical module controller 180 comprises a circuitry for generating the demand signals $D_x$, $D_y$ based upon control signals SC received from a master controller 140 (described in more detail below) and sensor processing circuitry for processing the sensor signals $S_n$ from the in-process monitoring module 160 and the position signals $P_x$, $P_y$ from the transducers 153, 154. The processing circuitry includes a filter 182 for filtering the analogue position signals $P_x$, $P_y$ and an analogue to digital converter 183 for converting the analogue position signals into digital signals $\theta_n$, $\Phi_n$. The circuitry is housed within a dust enclosure 181.

The demand signals $D_x$, $D_y$ are transmitted to the galvanometers in the light tight housing 157 and the position signal $P_x$, $P_y$ are transmitted from the light tight housing via an interface 170. The interface 170 provides shielding to prevent significant interference between the positon signals $P_x$, $P_y$ and the demand signals $D_x$, $D_y$, which could lead to inaccurate position measurements and/or incorrect positioning of the mirrors 150. In this embodiment, the interface comprises a PCB having a first layer 171 having demand signal tracks for transmitting the demand signals and a second layer 172 having position signal tracks for transmitting the position signals. The two layers 171, 172 are separated by a further layer having a ground plane 173 between the demand signal tracks and the position signal tracks so as to shield each signal form interference from the other signal. The PCB extends into the light tight housing 157 and into the dust enclosure 181 to electronically connect the galvanometers to the circuitry of controller 180.

The controller 180 packages the digital position values $\theta_n$, $\Phi_n$ derived from the position signals generated by the transducers 153, 154 and the sensor signal $S_n$ generated by the detector 161 into a data packet to be sent to the master controller 140. As described in more detail below, the data packet includes an identifier T that is the same as an identifier included in the command that is currently being executed by the controller 180. Each packet includes a single set of digital positon values $\theta_n$, $\Phi_n$ but may include multiple sensor values $S_n$.

The apparatus further comprises a gas nozzle 120 and gas exhaust 121 for generating a gas flow across the build surface (surface of the powder bed). The gas flow is generated by a pump 111 of a gas recirculation loop 122. A filter assembly 124 filters particles that become entrained in the gas flow from the recirculated gas.

The apparatus further comprises a sensor 190 for generating signals indicative of the build environment. For example, the sensor may be a sensor as described in WO2015/040433 and/or WO2016/0198885, a thermal camera, a visible light camera or other suitable sensor for use in additive manufacturing.

A master controller 140 is in communication with modules of the additive manufacturing apparatus, namely the laser modules 105a, 105b, optical modules 106a, 106b, build platform 102, dispensing apparatus 108, wiper 109, pump 111 and sensor(s) 150. In this embodiment, the network of modules and controller 140 is shown as a star network but other configurations could be used, such as a ring network. The controller 140 controls the modules based upon commands in a build file.

Figure 5:
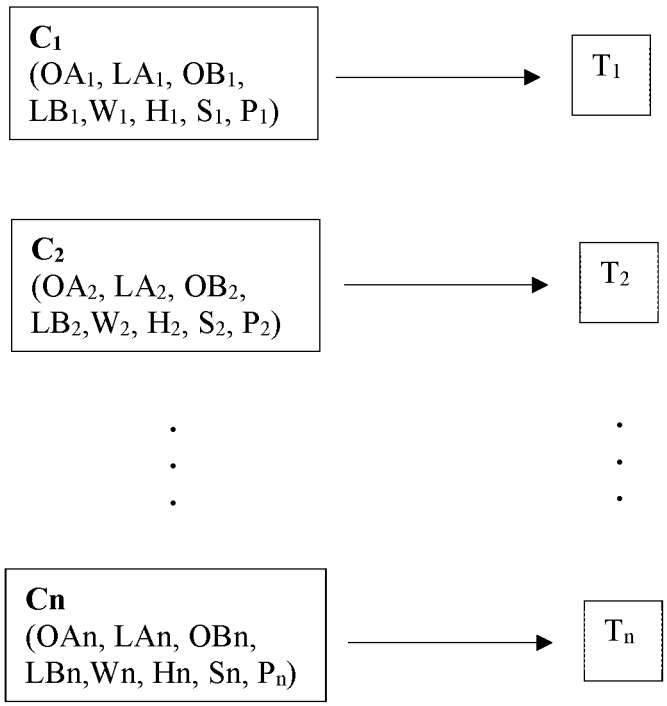
FIG. 5 is a schematic illustration of a build file according to one embodiment of the invention.

As shown in FIG. 5, the build file comprises a plurality of commands $C_1$ to $C_n$ to be executed by the controller 140 of the additive manufacturing apparatus. In FIG. 5, each command $C_1$ to $C_n$ comprises a required state OA, LA, OB, LB, W, H, S, P for the optical module 106a, laser 105a, optical module 106b, laser 105b, wiper 109, dispensing apparatus 108, build platform 102 and pump 11, respectively. Execution of the commands $C_1$ to $C_n$ by the controller 140 causes the controller 140 to generate signals that cause the modules to assume the required states as defined in each command. For example, the signals may cause the optical modules 106a, 106b, wiper 108 and/or build platform 102 to move to a required position, the dispensing apparatus to dose powder, the lasers 105a, 105b to switch on or off or to alter the laser power and/or for the pump 111 to switch on or off or change speed.

Each command is associated with an identifier T identifying a time at which the command C is to be executed. In this embodiment, the times are times from a start of the build (a time at which the first command is executed). The controller 140 comprises a clock 141 and uses clock signals from clock 141 to determine the time since the start of the build. The controller 140 executes each command $C_1$ to $C_n$ in accordance with the time identified by the associated identifier $T_1$ to $T_n$.

A time resolution and location at which the deterministic control is carried out will depend on the arrangement of the additive manufacturing apparatus and requirements for deterministic control. The modules 105a, 105b, 106a, 106b, 102, 108, 111 may have their own local processors (not shown) for interpreting the signals from controller 140 and controlling the module 105a, 105b, 106a, 106b, 102, 108, 111 as appropriate. The signal sent to a module by the controller 140 may comprise a general instruction that is to be implemented by a number of devices at the module 105a, 105b, 106a, 106b, 102, 108, 111 and/or in a number of steps.

For example, the controller 140 sends an instruction to an optical module 106a, 106b to expose a defined line (vector) to the laser beam using a series of point exposures separated by a defined point distance, each exposure being carried out for a set exposure time. The local processor of the optical module may execute this instruction by causing appropriate movements of galvanometers that control steerable mirrors for directing the laser beam 118. This may include the generation of a number of time spaced signals to cause movement of the galvanometers by the local processor of the optical module 105 to achieve the desired point spacing and exposure times. However, unlike the commands executed by the controller 140, neither the signals received by the optical module 105 from the controller 140 nor those received by the galvanometers from the local processor are associated with an identifier identifying a time at which the commands should be executed by the device (optical module or galvanometer). The instructions are executed upon receipt by the device.

In an alternative embodiment, the deterministic execution of commands is carried out at the modules rather than by the central controller 140. Each or at least some of the modules may comprise local processors and local clocks. At the start of a build, the central controller 140 may synchronise the local clocks to the master clock 141 of the controller 140. The controller 140 then sends out commands to the modules, each command associated with an identifier identifying a local time (as determined using the local clock) at which the command is to be executed by the module. The commands can then be queued at the modules and executed at the identified time.

The controller 140 also receives sensor data from sensor (s) and associates the sensor data received at a particular time, as determined from clock 141, with a time stamp. The sensor data can then be correlated with the commands associated with an identifier for a corresponding time such that the actions being carried out by the additive manufacturing apparatus at the time the sensor data is generated can be determined.

The build file is generated at a remote computer 130 and sent to the controller 140 via a suitable communication link.

The software for designing the build determines scan paths for the laser beams 118a, 118b to follow when consolidating material in manner is described in WO2014/207454. Once the scan paths have been determined, the allocation of the laser beam 118a, 118b to the scanning of the scan paths is determined, for example, using the method described in WO2014/199134. In the Figures, scanning of the layers is carried out synchronously with spreading of powder with the wiper 108a and lowering of the build platform 102, as described in WO 2015/140547. Accordingly, a timing at which the scans are performed by a laser beams 118a, 118b will depend on a position of the wiper 108 as well as a set speed for the scans. From the allocation of the laser beams 118a, 118b to the scan paths and the set scan speed (initial scan parameters), appropriate scan parameters, such as point distance and exposure time, laser power and spot size can be determined. The appropriate scan parameters may be determined using a thermal/energy model which determines an amount of energy to be input into a region to achieve a desired consolidation (melt) taking into account the energy input into adjacent regions and an amount of cooling that occurs between the consolidations of adjacent regions.

Figure 4:
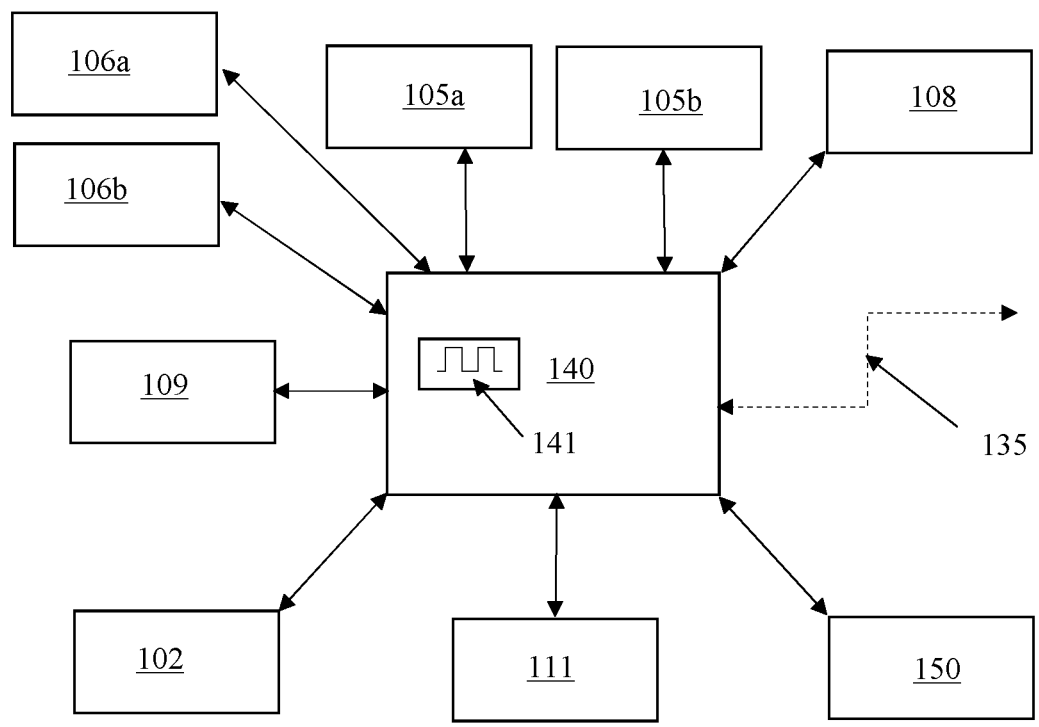
FIG. 4 is a schematic illustration of a system architecture of the additive manufacturing apparatus.

Commands are then generated in accordance with the scan parameters and scan paths, the software determining a time during the build at which each command is to be executed by the additive manufacturing apparatus to achieve the desired scan, and the determined time is identified in the identifier associated with the command, as shown in FIG. 4.

The instructions determined by computer 130 can then be uploaded to the controller 140 when the user wants to carry out the build.

Figure 6:
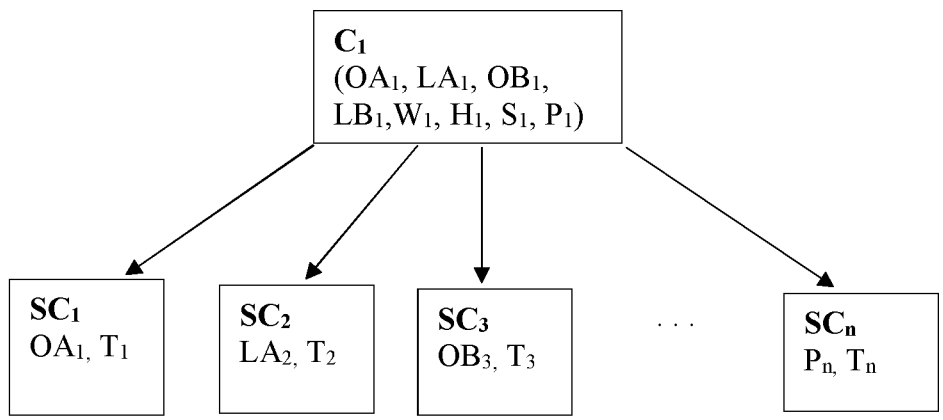
FIG. 6 is a schematic illustration of a generation of sub-commands by a controller of the additive manufacturing apparatus.
Figure 7:
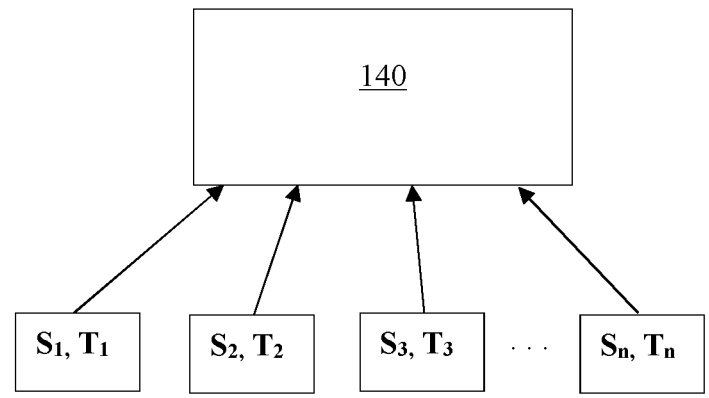
FIG. 7 is a schematic illustration of the reporting of sensor data packages to the controller.
Figure 8:
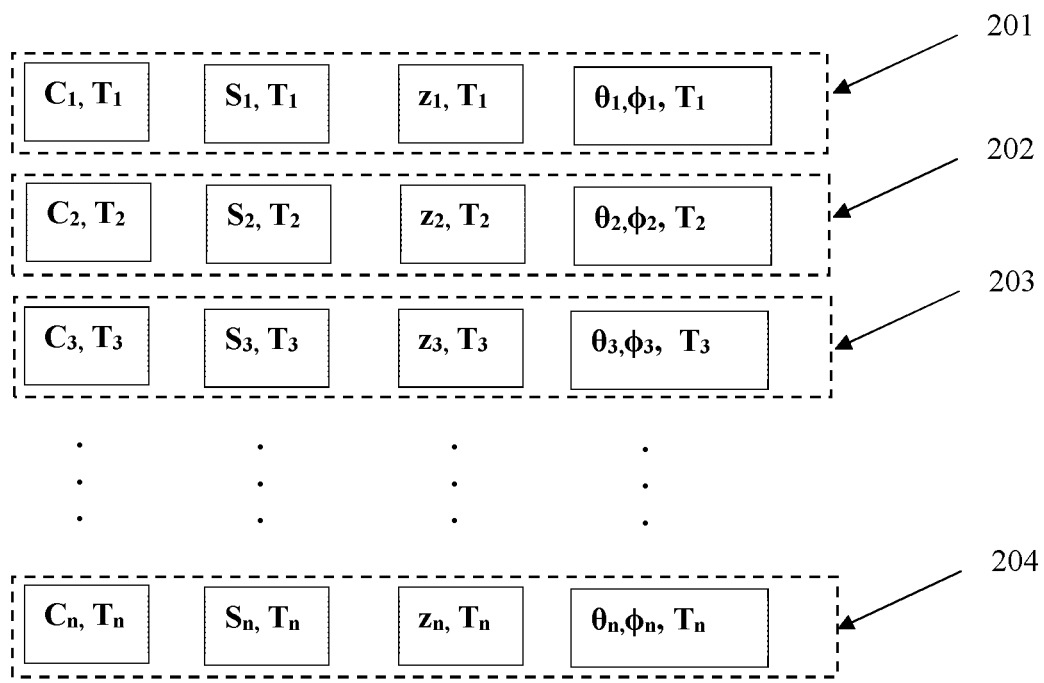
FIG. 8 is a schematic illustration of output data packages according to the invention.

Referring to FIGS. 6 to 8, in one embodiment, on execution of the commands at the specified time, the controller 140 generates sub-commands SC for the sub-systems 106, 106, 108, 109, 102. The sub-commands SC include the command(s) to executed by the sub-system and the identifier T of the command C which caused the sub-commands to be generated. For the sub-systems, the sub-commands SC include commands to take a sensor reading for one or more sensors present in the subsystem. For example, the laser 105 or optical module 106 comprises a sensor for measuring laser beam power and the optical module (further) comprise transducers 152, 153 for measuring the position of galvanometers and sensors for capturing images and or other data on the melt pool formed to consolidate material. The powder dispenser 108 comprises sensors for measuring a positon of an auger or movable plate, which controls dispense of powder from the hopper, and/or a sensor for measuring an amount of powder in the hopper. The wiper 109 comprises a position encoder for measuring a position of the wiper 109 and/or (an array of) metrology sensors for measuring a z-height of solidified material projecting from the powder bed. The z-axis comprises a position encoder for measuring a position of the build platform 102. The apparatus may comprise other sensors, such as acoustic sensors for recording sound/pressure waves generated by the additive build process and/or an oxygen sensor for measuring an oxygen content in the build chamber 101.

On receiving the sub-command, the sub-system executes the sub-command immediately, which, for the sub-commands including a command to take a sensor reading, involves the recording of a sensor value $S_1$ to $S_n$. The sub-system forms a sensor data package including the sensor value $S_1$ to $S_n$ and the identifier $T_1$ to $T_n$ contained in the sub-command which caused the sensor value to be captured. The sensor data package is sent to the master controller 140 as shown in FIG. 6.

With reference to FIG. 7, the sensor values $S_1$ to $S_n$ are packaged together with other sensor values from other sensors z, θ, Φ and commands C labelled with the same identifier T into an output data package 201 to 204. A positon in a working plane, build volume and/or on the component that was being consolidated at the time that the sensor value S was captured can be determined from the relevant sensor values z, θ, Φ or demand position contained in the command C.

The position is determined from the outputs θ, Φ from position encoders measuring the position of steering mirrors used to steer the laser beam onto the working plane and a measured position z of the build platform 102. By using the measured positions, the consolidation position at the time of capture of the sensor value can be determined taking into account differences between the demand position and the actual position.

The data packages 201 to 204 are output to a visualisation apparatus, such as computer 130 and the sensor data S displayed in a two or three dimensional representation in respect of a capture location on the object. The sensor data that is visualised may be sensor data relating to the melt pool formed during consolidation (for example as determined from radiation collected by the optical module 106 or at least one acoustic sensor) or other sensor data that may affect the quality of the object, such as oxygen content in the build chamber 101 at the time each region of the object was consolidated. This is possible through the known timing at which events occur during the build.

In one embodiment, the determination of the identifier to be included in a command, C, takes into account delays in the apparatus, such as communication delays and dynamics of the subsystems. The additive manufacturing apparatus may be (periodically) subjected to a calibration routine in which delays in the apparatus are determined. For example, a time difference between sending a command to the laser 105 and a ramping up of the laser power to the demanded power as detected by a photodiode, between sending of a command to move the steering mirrors or focusing optics and measurement of movement of the steering mirrors and/or focusing optics to the demanded position as determined from outputs from the position encoders and/or sending or a command to drive the platform 102 to a position and measurement of movement of the build platform 102 to the demanded position is/are determined. From these time differences, a calibration map or function is generated and used to determine the time at which the master controller 140 should send a sub-command to a subsystem (as determined by the identifier in the command) in order that the action is completed at the desired time (a time offset between sending the command and the desired time of execution of the action). The build preparation software (or other software that converts the scanning instructions into commands) uses the calibration map or function to generate the identifiers for the commands.

If the demand data is used to determine positions to correlate with the sensor values, then the calibration map or function may be used to determine the positon of the subsystem at the time of capture of the sensor value. For example, the calibration map or function may indicate that a command C in an output package 201 to 204 having an earlier identifier corresponds to a demand position of a subsystem at the time a sensor value is captured. If the position is a measured positon, then it is unlikely that there would be any significant time difference between the sensor values generated by different electronic sensors.

It will be understood that modifications and alterations may be made to the above described embodiments without departing from the invention as defined in the claims. Rather than the time for execution of the commands being defined from a common build start time, the times for different commands may be set relative to different start (zero) times. For example, the scanning commands for a particular layer may be set relative to a start time for the formation of that layer. The control method may be used with other types of additive manufacturing apparatus, for example other powder or resin bed additive manufacturing apparatus, such as stereolithography.

The invention claimed is:

1. A method of building an object with an additive manufacturing process, the method comprising:
   building an object in a layer-by-layer manner by directing a laser beam using at least one movable guiding element of a scanner to solidify selected regions of a material bed;
   recording position values generated from a transducer measuring positions of the at least one movable guiding element during the build, the at least one movable guiding element being one or more tiltable mirrors and the transducer measuring an angular position of the or each tiltable mirror;
   recording sensor values generated from a sensor for detecting radiation emitted from the material bed during the build and transmitted to the sensor by the at least one movable guiding element of the scanner; and
   associating each sensor value with a corresponding one of the position values so that the sensor values can be localised in the object and/or in the additive manufacturing apparatus based upon the measured positions of the at least one movable guiding element.

2. The method according to claim 1, wherein:
   the at least one movable guiding element comprises a first movable guiding element for directing the laser beam in a first dimension and a second movable guiding element for directing the laser beam in a second dimension substantially perpendicular to the first dimension, and
   the method comprises (i) recording first position values generated from a first transducer measuring positions of the first movable guiding element and, (ii) recording second position values generated from a second transducer measuring positions of the second movable guiding element, and (iii) associating each sensor value with a corresponding one of the first and second position values.

3. The method according to claim 1, wherein associating each sensor value with a corresponding one of the position values comprises associating the sensor value and the corresponding one of the position values with a common identifier.

4. The method according to claim 3, wherein the common identifier is a time.

5. The method according to claim 4, wherein the common identifier is a time associated with a demand signal instructing the scanner to move the laser beam to a position on the material bed and/or a time derived from a clock signal.

6. The method according to claim 1, wherein associating each sensor value with a corresponding one of the position values comprises packaging the sensor value and the corresponding one of the position in a single data packet.

7. The method according to claim 1, further comprising localising the sensor values in the object and/or in the additive manufacturing apparatus based upon the measured positions of the at least one movable guiding element.

8. The method according to claim 7, wherein localising the sensor values in the object comprises localising the sensor values in a coordinate reference frame of the object.

9. The method according to claim 7, wherein localising the sensor values in the additive manufacturing apparatus comprises localising the sensor values in a coordinate reference frame of the material bed.

10. The method according to claim 1, comprising shielding signals from the transducer from demand signals for the scanner.

11. The method according to claim 10, wherein the transducer generates analogue signals and the method comprises shielding the analogue signals from external noise and/or the demand signals until the analogue signals are converted into digital signals.

12. A method building an object with an additive manufacturing process, the method comprising:
   building an object in a layer-by-layer manner by directing a laser beam using at least one movable guiding element of a scanner to solidify selected regions of material bed;
   receiving sensor values generated from a sensor during the build, the sensor being arranged for detecting radiation emitted from the material bed and transmitted to the sensor by the movable guiding element;

receiving position values generated by a transducer measuring positions of the at least one movable guiding element during the build, the at least one movable guiding element being one or more tiltable mirrors and the transducer measuring an angular position of the or each tiltable mirror, and each sensor value being associated with a corresponding one of the position values; and for each sensor value, determining a localised position in the object and/or in the additive manufacturing apparatus of a region from which the sensor value was generated during the additive manufacturing process.

13. The method according to claim 12, comprising displaying the sensor values by way of a multi-dimensional representation with respect to a localised position of the sensor value in the object and/or in the material bed.

\* \* \* \* \*